(12) United States Patent
Adachi et al.

(10) Patent No.: US 7,050,676 B2
(45) Date of Patent: May 23, 2006

(54) OPTICAL SIGNAL ENCODING APPARATUS AND DECODING APPARATUS

(75) Inventors: Jingo Adachi, Moriguchi (JP); Shinichi Wakabayashi, Sagamihara (JP); Akihiro Itoh, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/262,954

(22) Filed: Nov. 1, 2005

(65) Prior Publication Data

US 2006/0056764 A1   Mar. 16, 2006

Related U.S. Application Data

(63) Continuation of application No. PCT/JP2005/004633, filed on Mar. 16, 2005.

(30) Foreign Application Priority Data

Jul. 15, 2004   (JP) ............................. 2004-208137

(51) Int. Cl.
  *G02B 6/34* (2006.01)
  *H04J 14/00* (2006.01)
(52) U.S. Cl. ............................ 385/37; 385/14; 385/27; 385/39; 398/43; 398/87; 398/99
(58) Field of Classification Search ................. 385/14, 385/37, 27, 39; 398/43, 87, 99
See application file for complete search history.

(56) References Cited

U.S. PATENT DOCUMENTS 6,292,282 B1 * 9/2001 Mossberg et al. ............. 398/99

(Continued)

FOREIGN PATENT DOCUMENTS

JP   2003-270594   9/2003

(Continued)

OTHER PUBLICATIONS

Geiger et al. "Demonstration of a Simple CDMA Transmitter and Receiver Using Sampled Fibre Gratings" ECOC'98, Sep. 1998, pp. 337-338.

(Continued)

*Primary Examiner*—John D. Lee
*Assistant Examiner*—James D. Stein
(74) *Attorney, Agent, or Firm*—McDermott Will & Emery LLP

(57) ABSTRACT

There is provided an apparatus for performing, by optical code division multiplex access, at least one of encoding and decoding of wavelength-division-multiplexed light. The apparatus includes: an optical input/output section 203 for handling input/output of the wavelength-division-multiplexed light; and N fiber gratings (where N is an integer equal to or greater than two) 101 to 103, which are in a series connection to the optical input/output section 203. Each of the N fiber gratings has a sampled grating structure having an alternating array of first regions (11 to 14; 21 to 24; and 31 to 34) which provide a refractive index modulation with a relatively large amplitude and second regions (201) which provide a refractive index modulation with a relatively small amplitude, the first and second regions being disposed with a constant period P. Each sampled grating structure defines a plurality of reflection wavelength bands which are replicated with a period that is equal to the interval ($\Delta T$) between the central wavelengths of wavelength bands contained in the wavelength-division-multiplexed light. The central values of the respective reflection wavelength bands differ from one fiber grating to another at least during operation.

11 Claims, 11 Drawing Sheets

U.S. PATENT DOCUMENTS

| | | |
|---|---|---|
| 6,381,053 B1 | 4/2002 | Fathallah et al. |
| 6,744,949 B1 | 6/2004 | Takeuchi et al. |
| 6,952,509 B1 | 10/2005 | Ishii |
| 2005/0089328 A1* | 4/2005 | Nishiki et al. ................ 398/77 |

FOREIGN PATENT DOCUMENTS

| | | |
|---|---|---|
| WO | WO 01/22126 A1 | 3/2001 |

OTHER PUBLICATIONS

Ibsen et al., "A 16-Channel OCDMA System (40CDM×4WDM) based on 16-chip, 20 Gchip/s Superstructure Fibre Bragg Gratings and DFB Fibre Laser Transmitters" OFC 2002, ThEE1, pp. 600-601.

Hauer et al., "Optically Assisted Internet Routing Using Arrays of Novel Dynamically Reconfigurable FBG-Based Correlators", Journal of Lightwave Technology, vol. 21, No. 11, (Nov. 2003) pp. 2765-2778.

Adachi et al., "Simultaneous FFH-CDMA Encoder/Decoder for Multiple WDMA Channels", Advanced Technology Research Lab., Matsushita Electric Industrial Co., Ltd. 2005, p. 177, w/English Translation.

Fathallah et al., "Passive Optical Fast Frequency-Hop CDMA Communications System", Journal of Lightwave Technology, vol. 17, No. 3, Mar. 1999, pp. 397-405.

Ibsen et al., "Sinc-Sampled Fiber Bragg Gratings for Identical Multiple Wavelength Operation" IEEE Photonics Technology Letters, vol. 10, No. 6, Jun. 1998, pp. 842-844.

Lee et al., "Purley Phase-Sampled Fiber Bragg Gratings for Broad-Band Dispersion and Dispersion Slope Compensation", IEEE Photonics Technology Letters, vol. 15, No. 8, Aug. 2003, pp. 1091-1093.

* cited by examiner (a)  (b)

OPTICAL SIGNAL ENCODING APPARATUS AND DECODING APPARATUS

RELATED APPLICATIONS

This application is a continuation of International Application No. PCT/JP2005/004633, whose international filing date is Mar. 16, 2005, which in turn claims the benefit of Japanese Application No. 2004-208137, filed Jul. 15, 2004, the disclosures of which Applications are incorporated by reference herein. The benefit of the filing and priority dates of the International and Japanese Applications is respectfully requested.

BACKGROUND OF THE INVENTION

1. Field of the Invention

The present invention relates to an apparatus which performs, by OCDMA (Optical Code Division Multiplex Access), at least one of encoding and decoding of wavelength-division-multiplexed light. More particularly, the present invention relates to an apparatus which employs fiber gratings to perform encoding/decoding by OCDMA.

2. Description of the Related Art

In OCDMA, a technique similar to the CDMA technology which has been practically used in the field of mobile communications is employed to perform encoding of an optical signal at a transmitting end, and decoding of an optical signal at a receiving end. The encoding/decoding of an optical signal is performed by using optical devices such as diffraction gratings, optical waveguides, or fiber gratings.

In OCDMA, even if a number of encoded optical signals exist in the same wavelength band, interferences therebetween are prevented because of code-by-code independence. Therefore, by assigning different codes to different users, it becomes possible for a large number of users to simultaneously share one optical signal propagating medium, even though optical signals in the same wavelength band are used.

Currently proposed encoding methods can be classified into, for example: Frequency-encoding techniques; Frequency-Hopping techniques; Fast-Frequency-Hopping techniques; and direct-sequence techniques. A Frequency-encoding technique is a method of encoding which varies the intensities of optical signals for different wavelengths. A Frequency-Hopping technique and a Fast-Frequency-Hopping technique are methods of encoding which vary wavelength and delay. A direct-sequence technique is a method of encoding which varies delay and phase for a single wavelength.

In "Passive Optical Fast Frequency-Hop CDMA Communications System", Habib Fathallah, Journal of Lightwave Technology, Vol. 17, No. 3, March 1999, there is proposed a Fast-Frequency-Hopping technique (hereinafter abbreviated as "FFH technique") which is performed by using fiber gratings which are assigned with different delays corresponding to different wavelengths. The present invention relates to this optical encoding method. This optical encoding method may sometimes be referred to as "time-spread/wavelength-hop optical CDMA".

First, with reference to FIG. 1, encoding/decoding by the conventional FFH technique will be described.

FIG. 1 corresponds to FIG. 1(b) in Habib. The apparatus shown in FIG. 1 is an encoder, which includes a series connection of optical fibers. Each optical fiber has a uniform fiber grating structure. The optical fibers are of the same structure, but different tensions are applied to the respective optical fibers by utilizing piezoelectric devices.

Since the grating period of each optical fiber varies in accordance with the tension applied thereto, the wavelength band in which Bragg reflection occurs is shifted from optical fiber to optical fiber. Therefore, each wavelength component contained in an incoming optical signal (a broadband light pulse) is reflected by a fiber grating in a different position, depending on the wavelength. Different reflection positions result in different amounts of time being required for the optical signal to make back and forth trips. As a result, the respective wavelength components of the optical signal are output from the optical fibers at different points in time. In other words, if a single broadband pulse is input to the encoder of FIG. 1, a plurality of light pulses will be output at different points in time, depending on their wavelengths.

Now, assume that N optical fiber gratings $F_1$ to $F_N$ are employed, with tensions being applied to the optical fiber gratings $F_1$ to $F_N$ so that they reflect light at central wavelengths $\lambda_1$ to $\lambda_N$, respectively. In this case, the reflection central wavelengths $\lambda_1$ to $\lambda_N$ may be of the following order of magnitude (ascending from left to right), for example:

$$\lambda_1 < \lambda_2 < \lambda_3 <, \ldots, < \lambda_{N-1} < \lambda_N$$

In this exemplary case, the wavelength $\lambda_1$ of light to be reflected by the optical fiber grating $F_1$ is the shortest, while the wavelength $\lambda_N$ of light to be reflected by the optical fiber grating $F_N$ is the longest. Such an order of reflection wavelengths can be easily changed by changing the combination of tensions to be applied to the N optical fibers $F_1$ to $F_N$. The number of possible permutations is $N! = N \times (N-1) \times (N-2) \times \ldots 3 \times 2 \times 1$. However, among these possible permutations, there may be some which are difficult to be distinguished from one another. Therefore, in actuality, the number of codes (described later) will be smaller than $N!$.

In the encoder of FIG. 1, optical signal encoding is performed by utilizing such an array of reflection wavelengths. In other words, in the aforementioned example, light which is reflected by the optical fiber $F_1$ follows the shortest optical path before coming out at an input/output section of the optical fibers, and hence sustains the shortest delay.

Thus, in the encoder of FIG. 1, a particular combination of wavelength dependences of delay may be selected from among the $N!$ permutations, and programmed to the encoder as its code pattern.

On the other hand, the apparatus of FIG. 1 may be allowed to function as a decoder. Specifically, by applying appropriate tensions to the optical fibers in the apparatus of FIG. 1, it is possible to cause inverse delays for canceling the delays which have occurred through the above-described encoding. By applying such delays, the encoded optical signal (which comprises a sequence of optical signals having different delays) can be decoded back to the original optical signal in the apparatus shown in FIG. 1.

Next, with reference to FIG. 2, a code pattern which is adoptable in OCDMA will be described.

In FIG. 2, (a) shows a relationship between the wavelength of an optical signal and the delay to be applied by an encoder, with respect to a particular code (hereinafter, such a relationship may be referred to as a "delay pattern"). In FIG. 2, (b) shows a relationship between the wavelength of an optical signal and the delay to be applied by a decoder for decoding an optical signal which has been encoded so as to have the delay pattern shown in (a) of FIG. 2. As seen from (a) and (b) of FIG. 2, an encoder and its corresponding decoder are supposed to have opposite delay patterns.

When the apparatus shown in FIG. 1 is to be employed in the context of wavelength division multiplexing (WDM), it becomes necessary to provide as many apparatuses of FIG. 1 as there are divided wavelength bands. This point will be described below, with reference to FIG. 3.

FIG. 3 schematically shows three codes (Code 1, Code 2, Code 3) against the central wavelengths $\lambda_1$ to $\lambda_4$ of four divided wavelength bands (wavelength channels). When OCDMA is used in conjunction with WDM, it becomes possible to assign different codes to each channel. As a result, a single optical signal propagating medium can be effectively shared by a large number of users for performing communications.

However, when OCDMA is to be used in conjunction with WDM, as many OCDMA encoder/decoders will be required as there are wavelength channels. As the number of WDM wavelength channels increases beyond ten, and even twenty in the future, a substantial increase in the encoder/decoder size would be inevitable.

SUMMARY OF THE INVENTION

In order to overcome the problems described above, preferred embodiments of the present invention provide an apparatus which can realize OCDMA encoding and/or decoding of wavelength-division-multiplexed light with a simple structure.

According to the present invention, there is provided an apparatus for performing, by optical code division multiplex access (OCDMA), at least one of encoding and decoding of wavelength-division-multiplexed (WDM) light, comprising: an optical input/output section for handling input/output of the wavelength-division-multiplexed light; and N fiber gratings (where N is an integer equal to or greater than two) which are in a series connection to the optical input/output section, wherein, each of the N fiber gratings has a sampled grating structure defining a plurality of reflection wavelength bands; and an interval $\Delta T$ between central values of the reflection wavelength bands of the sampled grating structure is equal to an interval S between central wavelengths of wavelength bands contained in the wavelength-division-multiplexed light, and the central values of the respective reflection wavelength bands differ from one fiber grating to another at least during operation.

In a preferred embodiment, between fiber gratings, the central value of each respective reflection wavelength band has a difference which is greater than a bandwidth of each reflection wavelength band and smaller than $\Delta T/N$.

In a preferred embodiment, the apparatus comprises, for each fiber grating, a code program device for controlling the sampled grating structure, wherein the code program device is capable of shifting the central values of the reflection wavelength bands defined by each sampled grating structure.

In a preferred embodiment, the code program device is capable of causing a period of refractive index modulation of the sampled grating structure of each fiber grating to be changed via heat or stress.

In a preferred embodiment, an amount of change in the period of refractive index modulation of each sampled grating structure introduced by the code program device is prescribed to be a value which is greater than the bandwidth of each reflection wavelength band.

In a preferred embodiment, the refractive index modulation of each sampled grating structure is modulated according to a sinc function.

In a preferred embodiment, each sampled grating structure has a first region which provides a refractive index modulation with a relatively large amplitude and a second region which provides a refractive index modulation with a relatively small amplitude, the period of modulation of the first region being equal to the period of modulation of the second region.

In a preferred embodiment, the apparatus operates as an encoder.

In a preferred embodiment, the apparatus operates as a decoder.

In a preferred embodiment, the apparatus decodes a signal which is encoded by the aforementioned apparatus.

An encoding/decoding system according to the present invention comprises the aforementioned apparatus functioning as an encoder and the aforementioned apparatus functioning as a decoder.

By employing fiber gratings each having a sampled grating structure, it becomes possible to replicate light reflection wavelength bands at predetermined wavelength intervals. By employing a series connection of a plurality of sampled fiber gratings having respectively different light reflection wavelength bands, it becomes possible to perform CDMA encoding/decoding for an optical signal which is wavelength-division-multiplexed. As a result, it becomes unnecessary to provide a separate encoding/decoding apparatus for each wavelength channel.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the apparatus of the present invention will be described with reference to the accompanying drawings.

Embodiment 1

First, with reference to FIG. 5, an encoder, as a first embodiment of the apparatus of the present invention, will be described. This encoder is also capable of operating as a decoder.

Figure 5:
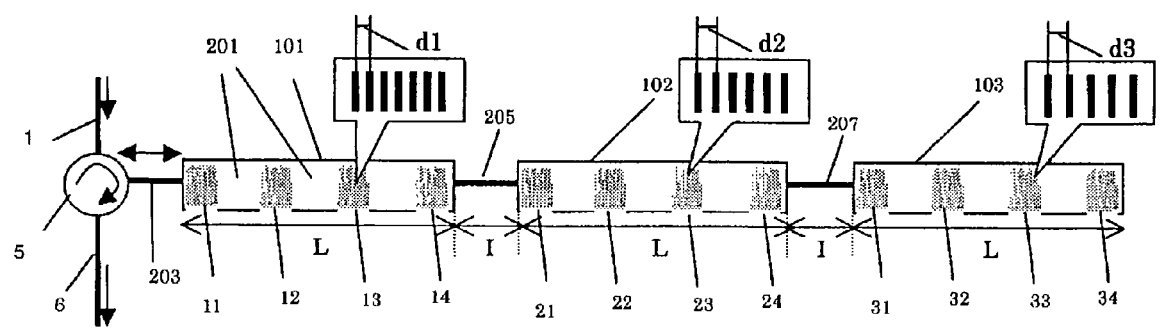
FIG. 5 is a diagram showing a first embodiment of an apparatus according to the present invention.

The encoder shown in FIG. 5 is an apparatus which performs an OCDMA encoding of wavelength-division-multiplexed light. The encoder comprises: an optical input/output section 203 for handling input/output of wavelength-division-multiplexed light; and N fiber gratings 101, 102, and 103 (N=3 in this example), which are in a series connection with the optical input/output section 203. The first fiber grating 101 and the second fiber grating 102 are optically coupled at a connecting portion 205, whereas the second fiber grating 102 and the third fiber grating 103 are optically coupled at a connecting portion 207. The length of each of the connecting portions 205 and 207 may be zero.

In the present embodiment, each of the fiber gratings 101, 102, and 103 has a sampled grating structure. Each sampled grating structure includes an alternating array of: first regions (11 to 14; 21 to 24; or 31 to 34) which provide a refractive index modulation with a relatively large amplitude; and second regions (201) which provide a refractive index modulation with a relatively small amplitude, the two types of regions being disposed with a constant period P. Hereinafter, the period P will be referred to as a "sampling period". In the present embodiment, it is assumed that the second region 201 has a substantially constant refractive index, and provides a refractive index modulation with a zero amplitude. However, it is not a requirement that the amplitude of refractive index modulation by the second region 201 be zero.

Assuming that the central wavelengths of the respective channels of wavelength-division-multiplexed light are at an interval "S" (i.e., interval between the bands of the respective channels of WDM), the aforementioned sampled grating structure is able to form a plurality of reflection wavelength bands that are "replicated" with a period equal to the interval S between the central wavelengths of the respective channels of wavelength-division-multiplexed light, as will be described in detail later. In other words, $\Delta T=S$ is true according to the present invention, where $\Delta T$ is the interval between the central wavelengths of the reflection wavelength bands which are replicated by the sampled grating structure. Note that the formation of the reflection wavelength bands (based on Bragg reflection) with the period $\Delta T$ is ascribable to the nature of the sampled grating. $\Delta T$ is in proportion with an inverse of the sampling period P, as is expressed by the following equation.

$$\Delta T = \lambda_B^2 / 2nP$$

In the above equation, $\lambda_B$ is a Bragg wavelength given a grating period d, and n is an effective refractive index.

Therefore, the size of $\Delta T$ can be controlled by adjusting the sampling period P. In the present embodiment, a sampling period P which realizes a $\Delta T$ value that matches the band interval of the wavelength-division-multiplexed light is determined, and then each fiber grating is assigned with a refractive index modulation with the sampling period P.

Figure 4:
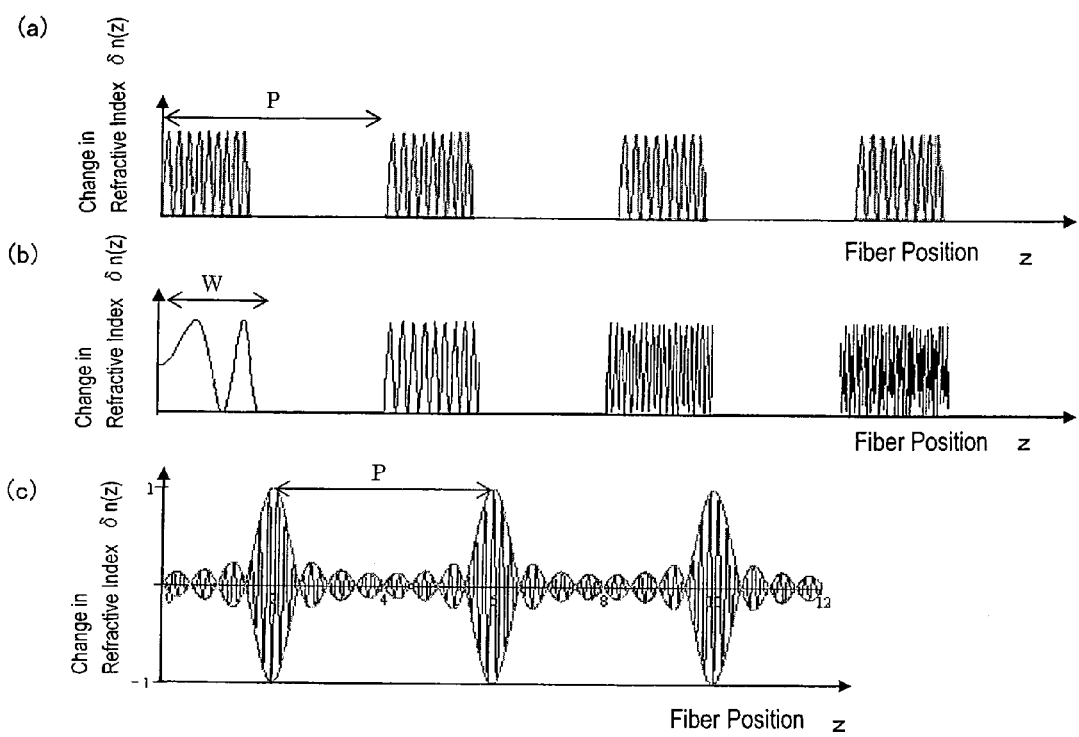
FIG. 4 includes: (a) a graph showing a relationship between change in refractive index $\delta n(z)$ and fiber positions z in a sampled uniform grating; (b) a graph showings a relationship between change in refractive index $\delta n(z)$ and fiber positions z in a sampled chirp grating; and (c) a graph showing a relationship between change in refractive index $\delta n(z)$ and fiber positions z in a sampled uniform grating which has been modulated in accordance with a sinc function.

A sampled grating is structured so that its grating period is not uniform along the direction of light propagation, such that the phase and/or amplitude of refractive index modulation is not uniform along the direction of light propagation. In FIG. 4, each of (a) to (c) shows an exemplary sampled grating structure. The vertical axis of each of these graphs represents change in refractive index $\delta n(z)$, and the horizontal axis represents the position z of a fiber grating along the longitudinal axis (optical signal propagating direction).

In FIG. 4, graph (a) shows $\delta n(z)$ of a sampled grating (super-structure) whose refractive index modulation amplitude changes in rectangular fashion, with a period (sampling period) P. Graph (b) shows $\delta n(z)$ of a chirped sampled grating in which the modulation phase of each refractive index-modulated region changes in accordance with the fiber position. Graph (c) shows $n\delta(z)$ of a sinc function-type sampled grating whose refractive index modulation amplitude is modulated by a certain mathematical function. A sinc function-type sampled grating is disclosed in "Sinc-Sampled Fiber Bragg Gratings for Identical Multiple Wavelength Operation" Morten Ibsen, IEEE Photonics Technology Letters, Vol. 10, No. 6, June 1998.

In the examples shown in (a) and (b) of FIG. 4, regions (having a length W) which provide a refractive index modulation with a relatively large amplitude are arranged with a sampling period P. Each of the remaining regions, which provide a refractive index modulation with a relatively small amplitude, has a zero amplitude. In other words, refractive index modulation is not performed (δn(z)=0) in any region interposed between the regions of the length W.

In the example shown in (c) of FIG. 4, too, regions (having a length W) which provide a refractive index modulation with a relatively large amplitude are similarly arranged with a sampling period P, but each of the remaining regions which provide a refractive index modulation with a relatively small amplitude has a non-zero amplitude. In other words, some refractive index modulation is performed in the regions interposed between the regions of the length W.

In the present embodiment, in order to cause the central values of the respective reflection wavelength bands of the fiber gratings 101, 102, and 103 to be shifted from one another, a different grating period is prescribed for each fiber grating.

Next, with reference to (a) to (d) of FIG. 7, an encoding method by the encoder of the present embodiment will be described.

Figure 7:
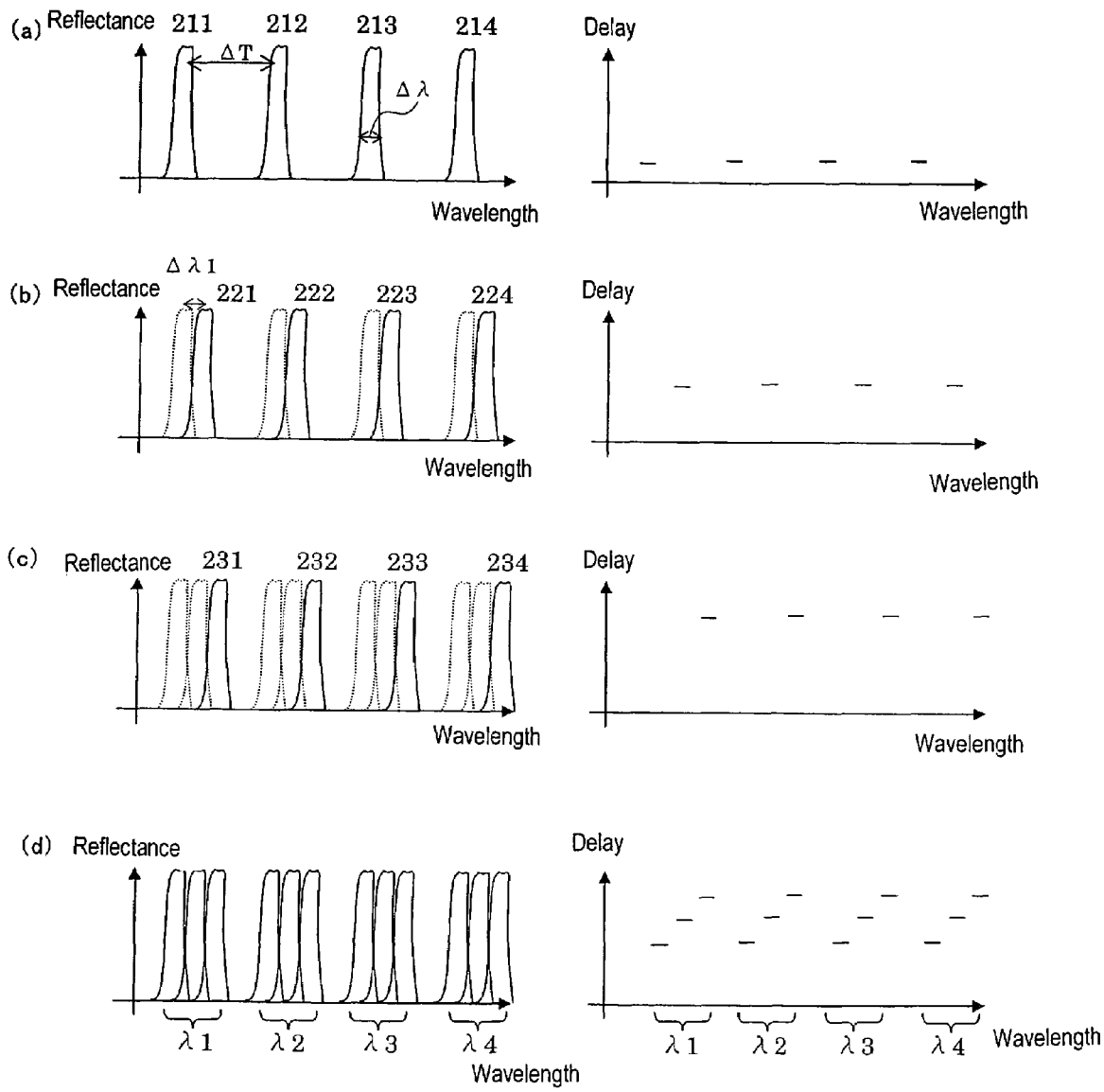
FIG. 7 includes: diagrams (a), (b), and (c) respectively showing reflectance patterns (wavelength dependences of reflectance) and delay patterns of sampled gratings 101, 102, and 103 shown in FIG. 5; and diagram (d) showing a reflectance pattern and a delay pattern of the entire apparatus shown in FIG. 5.

First, (a) of FIG. 7 is referred to. Graph (a) of FIG. 7 schematically shows the reflection wavelength band (reflection band) of the first fiber grating 101. The vertical axis of the graph represents reflectance, and the horizontal axis represents wavelength. As shown in (a) of FIG. 7, a plurality of reflection bands 211, 212, 213, and 214 are formed. The reflection bands 211, 212, 213, and 214 are laid out along the wavelength axis with a period ΔT. Each of the reflection bands 211, 212, 213, and 214 has a bandwidth represented as Δλ.

ΔT is set to a value which matches the period S of the wavelength channels of wavelength division multiplexing and which is equal to or greater than Δλ×N (where N is the number of fiber gratings).

Graph (b) of FIG. 7 schematically shows the reflection band of the second fiber grating 102. The vertical axis of the graph represents reflectance, and the horizontal axis represents wavelength. As shown in (b) of FIG. 7, a plurality of reflection bands 221, 222, 223, and 224 are formed. Similarly, the reflection bands 221, 222, 223, and 224 are laid out along the wavelength axis with a period ΔT. Each of the reflection bands 221, 222, 223, and 224 has the bandwidth represented as Δλ.

As is clear from the comparison between (a) and (b) of FIG. 7, the reflection bands 221, 222, 223, and 224 provided by the second fiber grating 102 are designed so as to be shifted with respect to the reflection bands 211, 212, 213, and 214 provided by the first fiber grating 101, the amount of shift being equal to Δλ1 toward the longer wavelength side.

Graph (c) of FIG. 7 schematically shows the reflection band of the third fiber grating 103. The vertical axis of the graph represents reflectance, and the horizontal axis represents wavelength. As shown in (c) of FIG. 7, a plurality of reflection bands 231, 232, 233, and 234 are formed. Similarly, the reflection bands 231, 232, 233, and 234 are laid out along the wavelength axis with a period ΔT. Each of the reflection bands 231, 232, 233, and 234 has the bandwidth represented as Δλ.

As is clear from the comparison between (a) and (c) of FIG. 7, the reflection bands 231, 232, 233, and 234 provided by the third fiber grating 103 are designed so as to be shifted with respect to the reflection bands 211, 212, 213, and 214 provided by the first fiber grating 101, the amount of shift being equal to Δλ1×2 toward the longer wavelength side.

Graph (d) of FIG. 7 shows the overall reflectance pattern of the encoder. This reflectance pattern is obtained by overlaying the reflectance patterns of the first to third fiber gratings 101 to 103 upon one another. In (d) of FIG. 7, wavelength bands λ1 to λ4 respectively correspond to the divided wavelength bands (wavelength channels) of wavelength-division-multiplexed light.

In order to realize the reflectance pattern shown in (d) of FIG. 7, it is necessary to set ΔT to a value which matches the period S of the wavelength channels, and which is equal to or greater than Δλ1×N (where N is the number of fiber gratings).

The graphs shown on the righthand sides of (a) to (c) of FIG. 7 are graphs showing the delay patterns obtained with the fiber gratings 101 to 103, respectively. As is clear from (d) of FIG. 7, the overall delay pattern of the encoder is what is obtained by overlaying the delay patterns of the first to third fiber gratings 101 to 103 upon one another.

Thus, by using a single encoder which is produced by using three fiber gratings, it is possible to form delay patterns corresponding to four wavelength channels (wavelengths λ1, λ2, λ3, and λ4). As a result, it is possible to perform encoding of wavelength-division-multiplexed light without increasing the size of the encoder. Moreover, this encoding can be performed simultaneously across the four wavelength channels (multiple operation).

The width Δλ of each reflection band replicated by the sampled grating structure corresponds to the "1 chip band" of FFH-CDMA. It is desirable to prescribe the length of Δλ to be 0.1 nm or more.

In a preferable embodiment of the present invention, each chip constituting a code pattern of optical encoding FFH-CDMA is "replicated" on the wavelength axis by implementing the corresponding fiber grating by using a sampled grating structure. Moreover, through similar replications on a number of chips, simultaneous encoding over a plurality of wavelength channels is enabled as a whole.

In the apparatus of the present embodiment, a plurality of sampled fiber gratings designed so that ΔT and Δλ satisfy the aforementioned conditions are used. However, the sampled fiber gratings are not limited to those having the structure as shown in (a) of FIG. 4, but may alternatively have a sampled chirp grating structure as shown in (b) of FIG. 4, or a sampled grating structure with modulated amplitudes as shown in (c) of FIG. 4.

In the example shown in FIG. 5, the three fiber gratings 101, 102, and 103 have grating periods of d1, d2, and d3, respectively, such that d1<d2<d3. In the present embodiment, as described above, the central wavelengths of the reflection wavelength bands of the respective fiber gratings are shifted by Δλ1 with respect to one another.

The number of fiber gratings to be employed in a series connection in a single apparatus is equal to the number N of chips of the encoding pattern. Therefore, in the case where three sampled fiber gratings are used as shown in FIG. 5, the number N of chips of the encoding pattern is equal to three. An encoding pattern in OCDMA is expressed by a code called "FH-sequence" or "one-coincidence", where the number N of chips must be set to two or more. The fiber gratings 101, 102, and 103 each have an equal length of "L". The connecting portions 205 and 207 each have a length of "I".

Hereinafter, the operation of the apparatus of FIG. 5 will be described.

First, a single-mode optical signal which is radiated from a light source (not shown) enters an optical fiber 1. The light source may be, for example, a broadband light source such as a pulse light source, a super continuum light source or an LED, or a comb-type light source of Fabry-Perot type or fiber ring laser type.

Via a circulator 5, the optical signal entering the optical fiber 1 is input to the optical input/output section 203, which is connected to the fiber grating 101. A portion of the optical signal entering into the fiber grating 101 is reflected by the fiber grating 101, while the remainder enters the fiber grating 102. The light which has been reflected by the fiber grating 101 enters an optical fiber 6, via the optical input/output section 203 and the circulator 5. Out of the optical signal entering the optical fiber 1, the light to be reflected by the fiber grating 101 is light in the reflection wavelength band which is defined by the grating period d1. In the aforementioned reflection wavelength band, narrow reflection bands are replicated with the period of $\Delta T$, as shown in (a) of FIG. 7. Light having any wavelength other than in this reflection band passes through the fiber grating 101.

A portion of the optical signal entering the fiber grating 102 is reflected by the fiber grating 102, while the remainder enters the fiber grating 103. The light which has been reflected by the fiber grating 102 enters the optical fiber 6 via the fiber grating 101, the optical input/output section 203, and the circulator 5. The light to be reflected by the fiber grating 102 is light in the reflection wavelength band which is defined by the grating period d2. In the aforementioned reflection wavelength band, narrow reflection bands are replicated with the period of $\Delta T$, as shown in (b) of FIG. 7. Light having any wavelength other than in this reflection band passes through the fiber grating 102.

A portion of the optical signal entering the fiber grating 103 is reflected by the fiber grating 103. The light which has been reflected by the fiber grating 103 enters the optical fiber 6, via the fiber grating 102, the fiber grating 101, the optical input/output section 203, and the circulator 5. The light to be reflected by the fiber grating 103 is light in the reflection wavelength band which is defined by the grating period d3. In the aforementioned reflection wavelength band, narrow reflection bands are replicated with the period of $\Delta T$, as shown in (c) of FIG. 7.

In a preferred embodiment, the amount of shift $\Delta\lambda 1$ between the reflection band of the second fiber grating 102 and the reflection band of the first fiber grating 101 is equal to the width $\Delta\lambda$ of each replicated rectangular reflection band. Therefore, when the reflection bands provided by these two fiber gratings are taken together, sets of peaks resembling two adjoining combteeth emerge ((b) of FIG. 7). Similarly, the amount of shift $\Delta\lambda 1$ between the reflection band of the third fiber grating 103 and the reflection band of the second fiber grating 102 is equal to the width $\Delta\lambda$ of each replicated rectangular reflection band. Therefore, when the reflection bands provided by these three fiber gratings are taken together, sets of peaks resembling three adjoining combteeth emerge ((d) of FIG. 7).

The reflected light from the second fiber grating 102 enters the optical fiber 6 after propagating over an optical path which is 2×(L+I) longer than that traveled by the reflected light from the first fiber grating 101. On the other hand, the reflected light from the third fiber grating 102 enters the optical fiber 6 after propagating over an optical path which is 4×(L+I) longer than that traveled by the reflected light from the first fiber grating 101.

Therefore, the delay imparted to the reflected light from the second fiber grating 102 is greater than the delay imparted to the reflected light from the first fiber grating 101. Similarly, the delay imparted to the reflected light from the third fiber grating 103 is greater than either of the delays imparted to the reflected light from the first and second fiber gratings 101 and 102.

The wavelength dependence of delay (delay pattern) provided by the entire apparatus is, as shown in (d) of FIG. 7, periodically replicated so as to correspond to the wavelength channels of $\lambda 1$ to $\lambda 4$.

In the present embodiment, the reflection bands of the second fiber grating 102 and the third fiber grating 103 are shifted by $\Delta\lambda 1$ and $2 \times \Delta\lambda 1$, respectively, from the reflection band of the first fiber grating 101. This encoder realizes an encoding in accordance with Code 1 shown in FIG. 3.

Generally speaking, in a series connection of N fiber gratings, the reflection wavelength of an $i^{th}$ fiber grating as counted from the optical input/output section side has a shift which is expressed as $m_i \times \Delta\lambda$ (where $m_i$ is an integer; $1 \leq i \leq N$).

Each code is defined by a particular combination of $m_i$. In selecting codes, however, care is to be taken so that there will be little correlation between codes. In CDMA, codes are selected by a technique called "FH-sequence" or "one-coincidence". As a result, the independence of the codes is improved, thus leading to a reduced decoding error rate.

In the example shown in FIG. 5, three fiber gratings 101 to 103 are coupled via the connecting portions 205 and 207. However, the number of fiber gratings to be coupled may be four or more. Alternatively, the fiber gratings 101 to 103 may be continuous, without being segmented by the connecting portions 205 and 207. In other words, a plurality of sampled grating structures may be formed within a single optical fiber, or a plurality of fiber gratings may be fused together.

In the example of FIG. 5, four refractive index modulation portions 11 to 14 are formed in each fiber grating. However, the number of refractive index modulation portions in each sampled fiber grating structure may be two or more.

A decoder for decoding an optical signal which has been encoded by the encoder shown in FIG. 5 can be produced by reversing the connection order of the fiber gratings 101 to 103 in the apparatus of FIG. 5. In other words, the fiber grating 103, the fiber grating 102, and the fiber grating 101 are connected in this order from the optical input/output section 203 side to form a series connection. As a result, a delay pattern which is opposite to the delay pattern shown in (d) of FIG. 7 is obtained, which enables decoding of the optical signal.

Next, the effects obtained in the case where a chirped sampled fiber grating as shown in (b) of FIG. 4 is used will be described.

Figure 8:
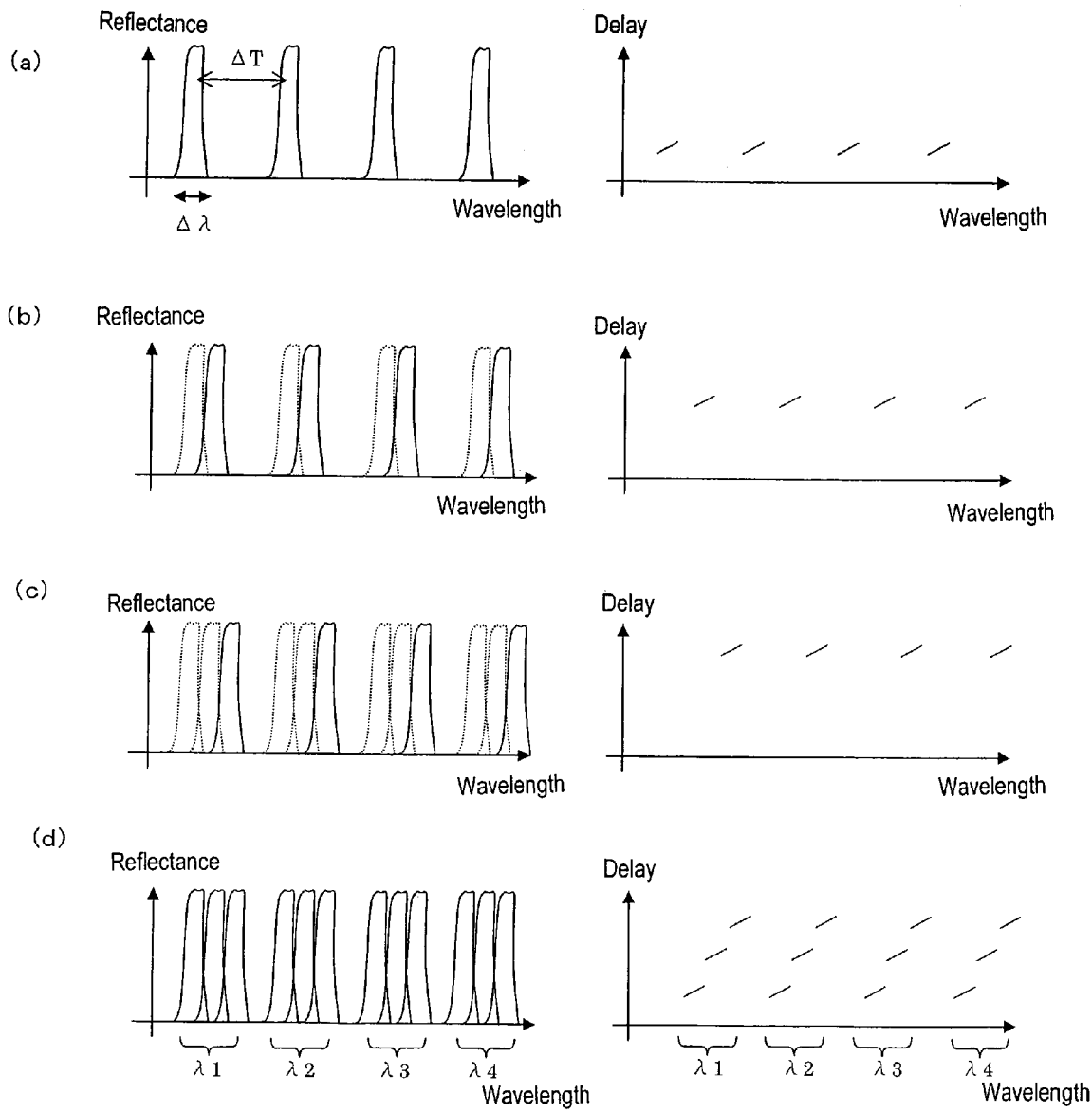
FIG. 8 includes: diagrams (a), (b), and (c) respectively showing reflectance patterns and delay patterns of sampled gratings 101, 102, and 103 shown in FIG. 6; and diagram (d) showing a reflectance pattern and a delay pattern of the entire apparatus shown in FIG. 6.

Graphs (a) to (d) of FIG. 8 correspond to graphs (a) to (d) of FIG. 7, respectively, except that the refractive index modulation portions of each fiber grating are chirped. The chirping allows the width $\Delta\lambda$ of each reflection band to be varied. Moreover, as is clear from (a) to (d) of FIG. 8, a gradient can be given to the delay of each reflection band. In other words, line segments representing the replicated delay patterns are slanted, rather than being parallel to the horizontal axis of the graph.

In order to secure a necessary band for encoding, $\Delta T$ must be prescribed to be equal to or greater than the bandwidth of a single channel of wavelength division multiplexing. As described earlier, P and ΔT are in inverse proportion with each other such that ΔT decreases as P increases. Therefore, preferably, the sampling period P in the first to third fiber gratings is prescribed to 2 mm or less.

Embodiment 2

Hereinafter, a second embodiment of the apparatus of the present invention will be described.

In the present embodiment, programming of code patterns is made possible by using a plurality of fiber gratings having an identical structure.

Figure 6:
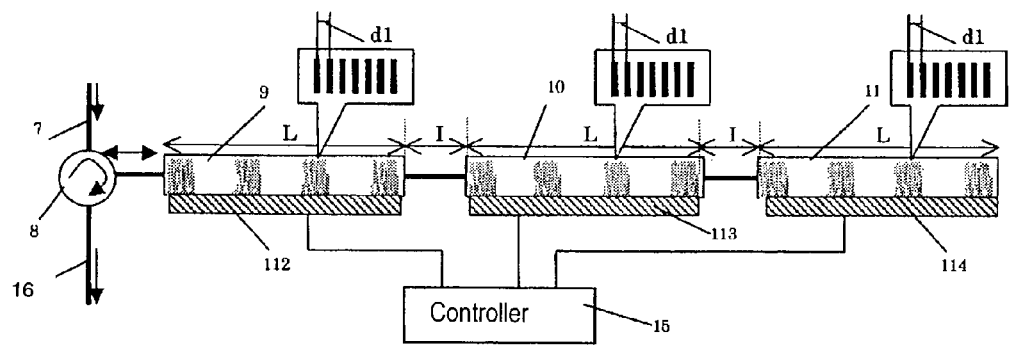
FIG. 6 is a diagram showing a second embodiment of an apparatus according to the present invention.

First, FIG. 6 is referred to. FIG. 6 is a diagram showing the structure of the apparatus of the present embodiment. The apparatus shown is an apparatus which performs an OCDMA encoding of wavelength-division-multiplexed light. The encoder comprises: an optical input/output section 203 for handling input/output of wavelength-division-multiplexed light; and N fiber gratings 9, 10, and 11 (again N=3 in this example), which are in a series connection with the optical input/output section 203. Each of the fiber gratings 9, 10, and 11 has a sampled grating structure. Each sampled grating structure includes an alternating array of: first regions which provide a refractive index modulation with a relatively large amplitude; and second regions which provide a refractive index modulation with a relatively small amplitude, the two types of regions being disposed with a constant sampling period P.

The apparatus of the present embodiment differs from the apparatus of FIG. 5 in that the fiber gratings 9, 10, and 11 have an identical structure, and that the apparatus comprises devices which are capable of independently and adaptively adjusting the grating periods of the fiber gratings 9, 10, and 11.

The grating period of a fiber grating is changeable based on the temperature the fiber grating or a tension applied to the fiber grating, and the reflection wavelength band of the fiber grating can be changed (shifted) based on its grating period. In accordance with the apparatus of the present embodiment, programming (i.e., arbitrary changing after fabrication of the apparatus) of encoding patterns and decoding patterns is possible.

In the apparatus shown in FIG. 6, the fiber gratings 9, 10, and 11 are in thermal contact with temperature adjustment devices 112, 113, and 114, respectively. The temperature adjustment devices 112, 113, and 114 are composed of heaters, Peltier devices, or the like, and function as temperature control means. The temperature adjustment devices 112, 113, and 114 are connected to a controller 15 which independently adjusts the temperatures of the fiber gratings 9, 10, and 11.

In the present embodiment, the grating periods of the fiber gratings 9, 10, and 11 are all equal to d1 at room temperature, so that no encoding pattern can be created.

By applying respectively different temperatures to the fiber gratings 9, 10, and 11, the reflection bands provided by the fiber gratings are shifted from one another, thus making it possible to create an encoding pattern.

Hereinafter, the operation of the apparatus of FIG. 6 will be described.

First, a single-mode optical signal which is radiated from a light source (not shown) enters an optical fiber 7. Via a circulator 8, the optical signal entering the optical fiber 7 is coupled to the fiber grating 9. A portion of the optical signal entering into the fiber grating 9 is reflected by the fiber grating 9, while the remainder enters the fiber grating 10.

The light which has been reflected by the fiber grating 9 enters an optical fiber 16, via the circulator 8. Out of the optical signal entering the optical fiber 7, the light to be reflected by the fiber grating 9 is light in a reflection wavelength band that is defined by a grating period which is altered from d1 by the temperature adjustment device 112.

Unless temperature adjustment is performed, light in the reflection band defined by the grating period d1 will be reflected by the fiber grating 9, so that no reflection will occur in the other fiber gratings 10 and 11.

In the present embodiment, the temperatures of the fiber gratings 10 and 11 are adjusted to respectively different levels, thus allowing a portion of the light which has been transmitted through the fiber grating 9 to be reflected by the fiber grating 10 or the fiber grating 11.

When provided with an appropriate temperature distribution, each of the fiber gratings 9, 10, and 11 acquires a plurality of narrow replicated reflection bands as shown in (a) to (c) of FIG. 7.

Figure 3:
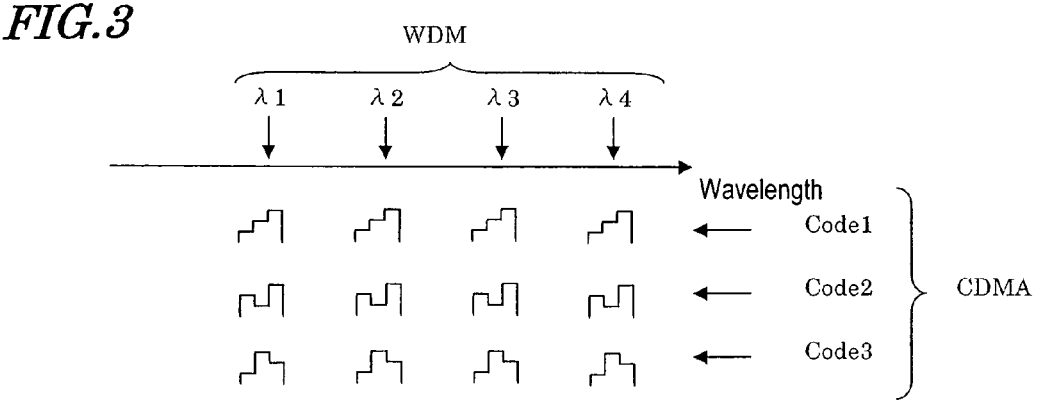
FIG. 3 is a diagram schematically showing a relationship between code patterns and wavelength bands (channels), in the case where OCDMA is used in conjunction with WDM (wavelength division multiplexing).

Based on the temperature settings of the fiber gratings 9, 10, and 11, an encoding pattern according to Code 1, Code 2, or Code 3 as shown in FIG. 3, for example, can be created. Light which has been reflected by the sampled gratings 9, 10, and 11 returns to the circulator 8, and goes out into the optical fiber 16.

The apparatus of the present embodiment can also operate not only as an encoder but also as a decoder, similarly to the earlier-described embodiment. Moreover, chirped sampled gratings may be used as the fiber gratings. Note that it is not a requirement that the initial grating structures of the fiber gratings be identical. Rather, the grating periods may initially be different as in the case of the apparatus shown in FIG. 5.

Hereinafter, results of simulations and experiments which have been performed with respect to embodiments of the present invention will be described.

Firstly, the relationship between parameters which are necessary in the simulations will be described. A relationship expressed by eq. 1 below must be satisfied by: the bandwidth Δλ of each of the reflection bands replicated by sampling effects on the fiber grating; a period ΔT of the replicated reflection bands; and the number N of chips composing a code.

$$N \le \frac{\Delta T}{\Delta \lambda} \quad [\text{eq. 1}]$$

Ideally, no ripple or the like exists outside the reflectance pattern defining each reflection band, and each reflectance pattern is completely rectangular. In practice, however, each reflectance pattern is not completely rectangular. Therefore, N must be prescribed to be smaller than ΔT/Δλ.

As N increases, the code length increases, and therefore the number of codes increases. The more codes there are, the more users can utilize the same wavelength channel, which is preferable (number of users=number of codes).

In the case where the optical signal is in pulse form, ΔT corresponds to the bandwidth of each pulse, and is usually 0.6 nm or more. In order to increase ΔT, the sampling period P should be decreased. In order to reduce Δλ by realizing a thin, near-rectangular reflection band, it is preferable to increase the overall length L of each fiber grating.

Therefore, in order to increase N, it is preferable to reduce the sampling period P and increase the overall length L of each fiber grating.

On the other hand, among the reflection bands replicated by the sampled grating structure, the total number of those which are available for use depends on the longitudinal direction length W of each refractive index-modulated region provided by the sampled grating structure (see FIG. 4). As W decreases, the width of the sinc function covering the replicated reflection bands increases, whereby the total number of the replicated reflection bands is increased.

As described earlier, it is preferable that each replicated reflection band is completely rectangular. If unwanted ripple exists on either side of the reflection band, when overlaying as shown in (d) of FIG. 7 is performed, light having a wavelength corresponding to the ripple may be reflected by a number of different fiber gratings. In order to reduce such ripple and obtain a near-rectangular reflection band, it is effective to perform apodization.

[Simulations]

Next, results of simulations performed with respect to the apparatus of FIG. 6 will be described. Based on the mode coupling theory, the simulations were performed by optimizing the relationship between wavelength and delay for encoding/decoding.

Figure 9:
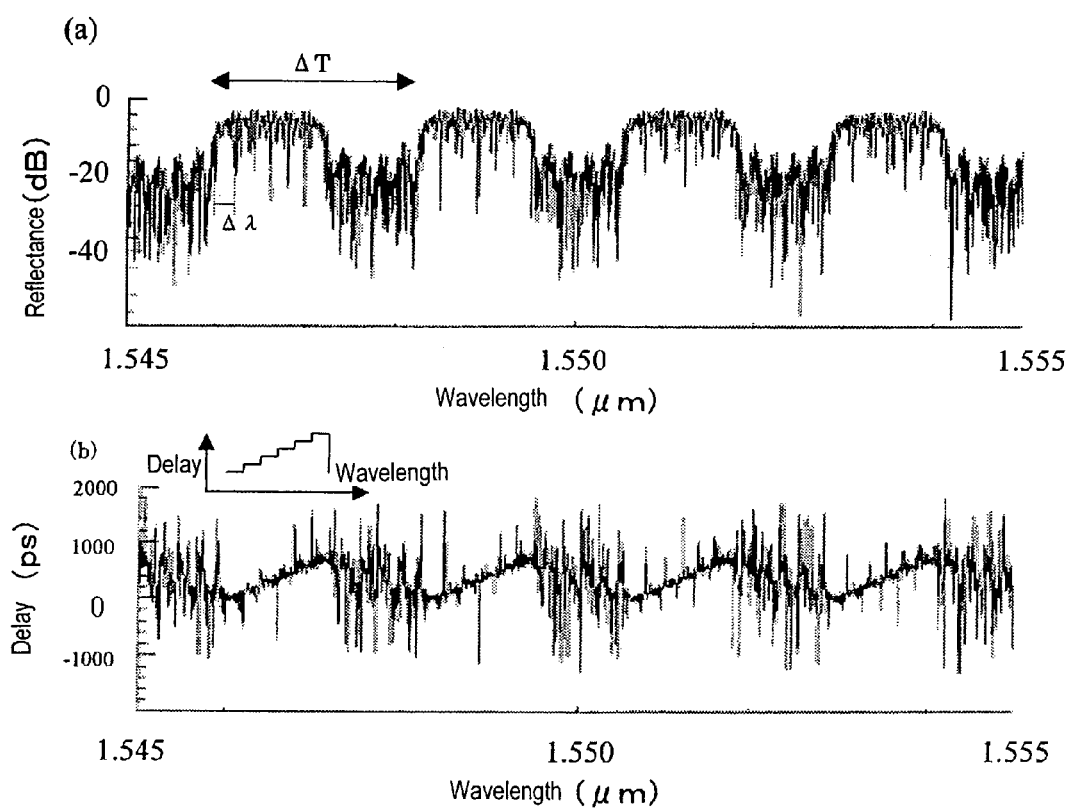
FIG. 9 includes (a) a graph showing a simulation result of a reflectance pattern of an encoder which realizes a certain code; and (b) a graph showing a simulation result of a delay pattern of the encoder.
Figure 10:
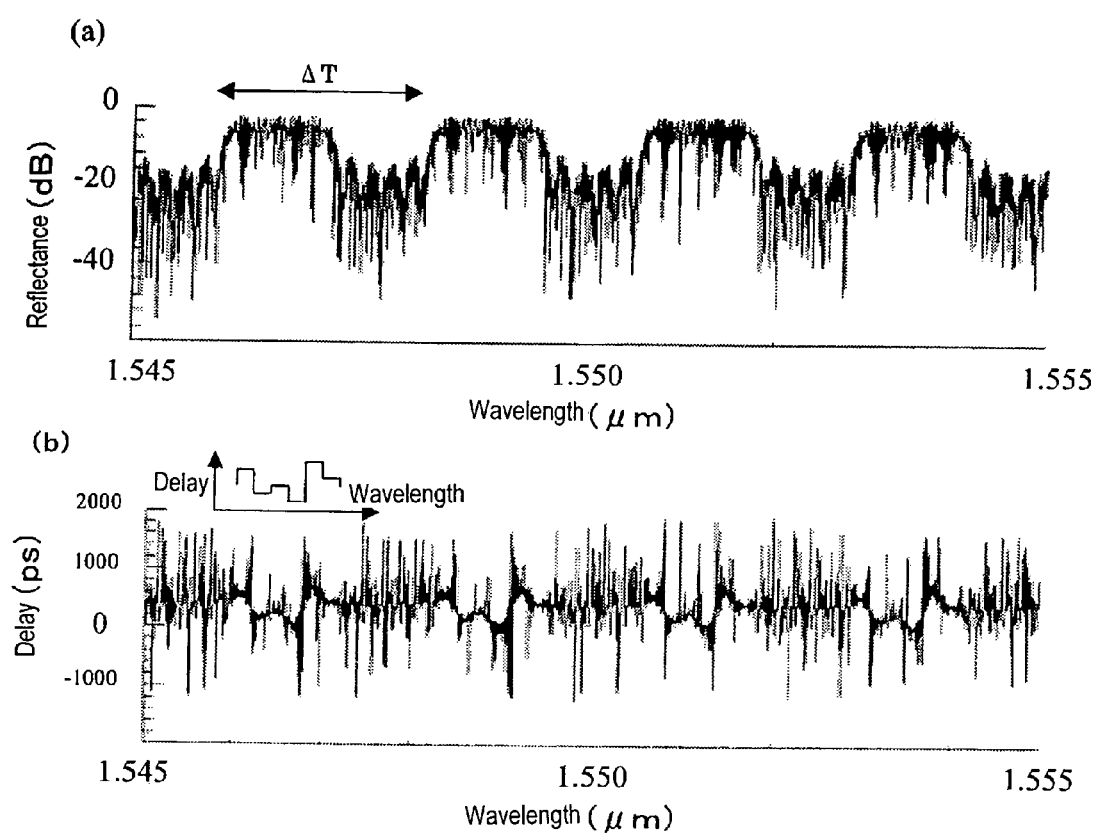
FIG. 10 includes (a) a graph showing a simulation result of a reflectance pattern of an encoder which realizes another code; and (b) a graph showing a simulation result of a delay pattern of the encoder.

With reference to FIGS. 9 and 10, results concerning two different codes will be described. In each of FIGS. 9 and 10, (a) is a graph showing the wavelength dependence of reflectance (reflectance pattern), where the horizontal axis represents wavelength [µm] and the vertical axis represents reflectance; and (b) is a graph showing the wavelength dependence of delay (delay pattern), where the horizontal axis represents wavelength [µm] and the vertical axis represents delay [ps].

In the delay pattern shown in (b) of FIG. 9, delay increases in a stepwise manner responsive to increase in wavelength. On the other hand, in the delay pattern shown in (b) of FIG. 10, delay increases or decreases responsive to increase in wavelength. These delay patterns represent different codes.

The simulations were performed under the conditions as shown in Table 1 below.

TABLE 1

| | |
|---|---|
| number N of fiber gratings | 6 |
| length L of each fiber grating | 3.6 mm |
| interval I between fiber gratings | 1 cm |
| maximum change δn in refractive index | 0.001 |
| sampling period P | 300 µm |
| longitudinal length W of refractive index modulation portion | 60 µm |
| grating period d | 0.53381599 µm |
| chirp amount | 0 |

In order to obtain the delay pattern shown in (b) of FIG. 9, the temperatures of six fiber gratings were set as shown in Table 2 below. In order to obtain the delay pattern shown in (b) of FIG. 10, the temperatures of six fiber gratings were set as shown in Table 3 below.

TABLE 2

| fiber grating | temperature |
|---|---|
| #1 | 10° C. |
| #2 | 25° C. |
| #3 | 40° C. |
| #4 | 55° C. |
| #5 | 70° C. |
| #6 | 80° C. |

TABLE 3

| fiber grating | temperature |
|---|---|
| #1 | 55° C. |
| #2 | 25° C. |
| #3 | 40° C. |
| #4 | 85° C. |
| #5 | 10° C. |
| #6 | 75° C. |

In each case, calculations were performed by prescribing the coefficient of thermal expansion of each fiber grating to be $5.5 \times 10^{-7}$, and the thermooptic constant of each fiber grating to be $8.3 \times 10^{-6}$.

At an upper left corner of (b) of FIGS. 9 and 10, a code pattern is shown. Each delay pattern has a shape consisting of replicated code patterns. The replication period $\Delta T$ is about 2 nm, and the bandwidth $\Delta \lambda$ of a single chip is about 0.26 nm.

In the simulations, the temperatures of the six fiber gratings were set at six different levels in a range from 10° C. to 85° C. In order to set more (than six) levels of temperature for increasing the number N of chips, it is preferable to increase the maximum temperature level. If the temperature differences between fiber gratings were reduced, the amounts of shift between the reflection wavelength bands of the fiber gratings might be insufficient. Therefore, the temperature of the fiber grating that is supposed to have the greatest wavelength shift amount is preferably set to a level higher than 85° C.

However, in the case of using Peltier devices, the highest temperature that can be set is about 85° C. Moreover, there are limits to the amount of changes in the grating period that can be obtained through adjustments of temperature or tension alone. Therefore, devices such as temperature adjustment devices may be used in combination with a plurality of fiber gratings having different initial grating period values.

Hereinafter, experimental results will be described with reference to FIGS. 11A to 11I and FIG. 12. The apparatus used for this experimentation had design parameters as shown in Table 4 below.

TABLE 4

| | |
|---|---|
| number N of fiber grating | 6 |
| length L of each fiber grating | 20 mm |
| interval I between fiber gratings | 1 cm |
| maximum change δn in refractive index | 0.001 |
| sampling period P | 600 µm |
| longitudinal length W of refractive index modulation portion | 250 µm |
| grating period d | 0.53845 µm |
| chirp amount | 0 |

The central wavelengths of reflection bands provided by the six fiber gratings are shifted with respect to one another by an integer multiple of $\Delta \lambda (=0.12$ nm). In the results shown in FIGS. 11A to 11I, the central wavelengths of the reflection bands are shifted by applying different temperatures to the six fiber gratings.

Figure 11A:
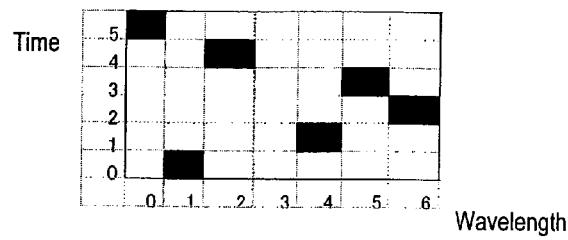
FIG. 11A is a diagram showing an experimental result of an encoding according to the present invention, and is a matrix chart showing the pattern of Code 1.
Figure 11B:
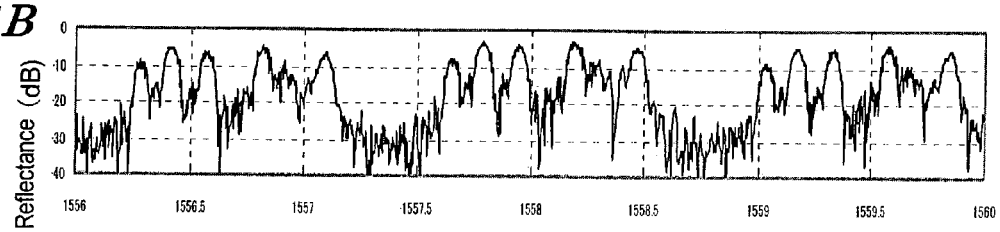
FIG. 11B is a diagram showing an experimental result of an encoding according to the present invention, and is a graph showing a reflectance pattern of an encoder for Code 1.
Figure 11C:
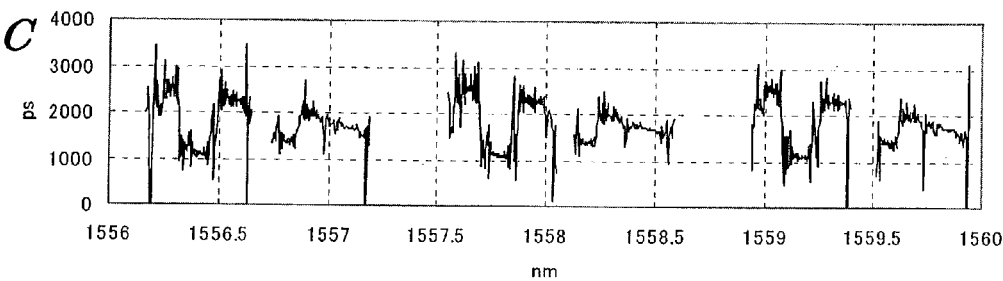
FIG. 11C is a diagram showing an experimental result of an encoding according to the present invention, and is a graph showing a delay pattern of an encoder for Code 1.

FIG. 11A is a matrix chart representing Code pattern 1. FIG. 11B is a graph showing measurement results of reflectance patterns. FIG. 11C is a graph showing measurement results of delay patterns.

In the matrix chart of FIG. 11A, the vertical axis represents delay time, and the horizontal axis represents the wavelength of signal light. In the column which registers "1"

on the horizontal axis, a black rectangular region is located at a row which registers "0" on the vertical axis. This means that the smallest delay occurs in a wavelength band corresponding to "1". On the other hand, in the column which registers "0" on the horizontal axis, a black rectangular region is located at a row which registers "5" on the vertical axis. This means that the largest delay occurs in a wavelength band corresponding to "0".

When the encoder performs an encoding in accordance with the matrix chart of FIG. 11A, light of the wavelength "1" will be first output from the encoder, followed sequentially by light of the wavelengths "4", "6", "5", "2", and "0". In other words, when a single pulse of light is input to the encoder, a number of subdivided output pulses are obtained corresponding to the respective wavelength bands of the light pulse. A decoder is to operate in an opposite manner.

Figure 1:
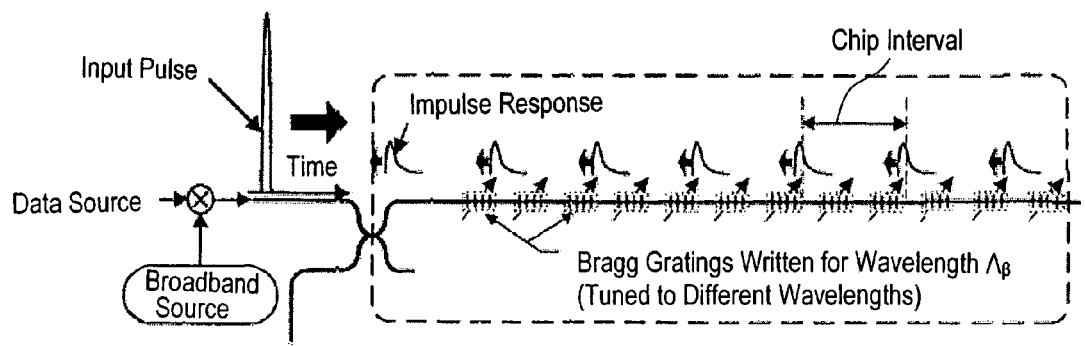
FIG. 1 is a diagram showing a conventional example of an OCDMA encoder.
Figure 2:
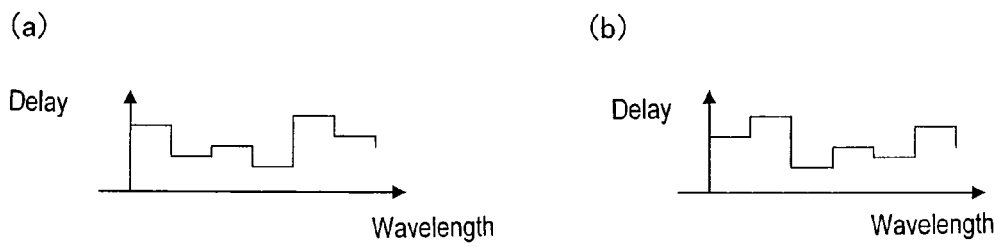
FIG. 2 includes: (a) a diagram showing a relationship (delay pattern) between wavelength and delay for encoding; and (b) a diagram showing a delay pattern for decoding, these delay patterns corresponding to a particular code pattern.

According to a simulation performed by the inventors, as shown in FIG. 1C, three delay patterns each corresponding to Code pattern 1 were observed at a constant interval. The three delay patterns respectively match three wavelength channels of WDM.

Thus, it was confirmed that, by using sampled fiber gratings, optical signals contained on a plurality of WDM channels can be simultaneously encoded or decoded, by using a single encoder or decoder.

In order to obtain the delay pattern shown in FIG. 11C, the temperatures of the six fiber gratings were set as shown in Table 5 below.

TABLE 5

| fiber grating | temperature |
|---|---|
| #1 | 15° C. |
| #2 | 45° C. |
| #3 | 56° C. |
| #4 | 80° C. |
| #5 | 53° C. |
| #6 | 35° C. |

Next, by using the same apparatus, the temperatures of the fiber gratings were changed to the levels shown in Table 6 below.

TABLE 6

| fiber grating | temperature |
|---|---|
| #1 | 39° C. |
| #2 | 64° C. |
| #3 | 6° C. |
| #4 | 27° C. |
| #5 | 68° C. |
| #6 | 59° C. |

Thus, by merely changing the fiber temperatures, the central wavelengths of the reflection bands provided by the fiber gratings were shifted by integer multiples of $\Delta\lambda(=0.12$ nm), whereby different code patterns were realized.

Figure 11D:
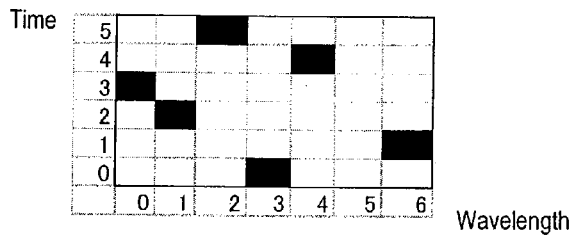
FIG. 11D is a diagram showing an experimental result of an encoding according to the present invention, and is a matrix chart showing the pattern of Code 2
Figure 11E:
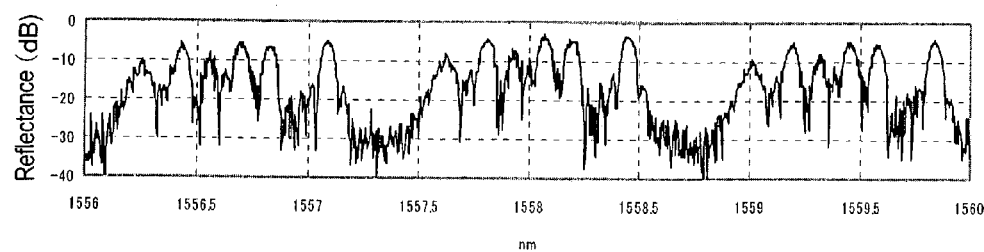
FIG. 11E is a diagram showing an experimental result of an encoding according to the present invention, and is a graph showing a reflectance pattern of an encoder for Code 2.
Figure 11F:
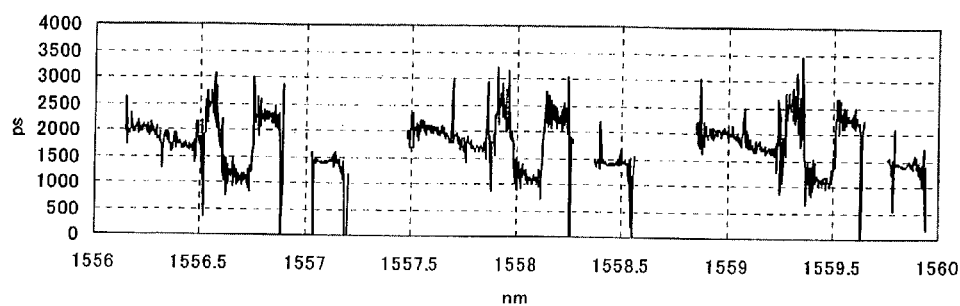
FIG. 11F is a diagram showing an experimental result of an encoding according to the present invention, and is a graph showing a delay pattern of an encoder for Code 2.

FIG. 11D is a matrix chart representing Code pattern 2. FIG. 11E is a graph showing measurement results of reflectance patterns. FIG. 11F is a graph showing measurement results of delay patterns. As shown in FIG. 11F, three delay patterns each corresponding to Code pattern 2 were observed at a constant interval. The three delay patterns respectively correspond to three wavelength channels.

Figure 11G:
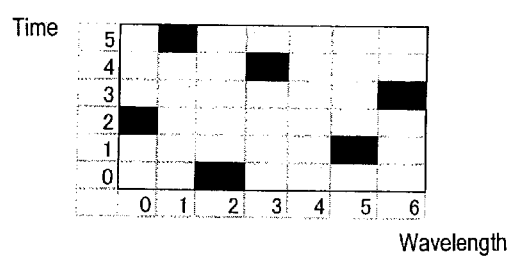
FIG. 11G is a diagram showing an experimental result of an encoding according to the present invention, and is a matrix chart showing the pattern of Code 3
Figure 11H:
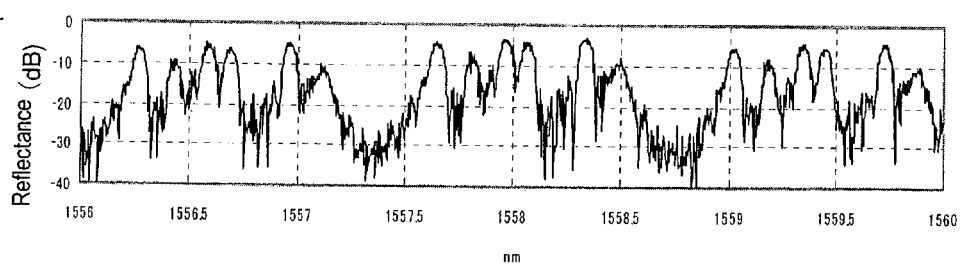
FIG. 11H is a diagram showing an experimental result of an encoding according to the present invention, and is a graph showing a reflectance pattern of an encoder for Code 3.
Figure 11I:
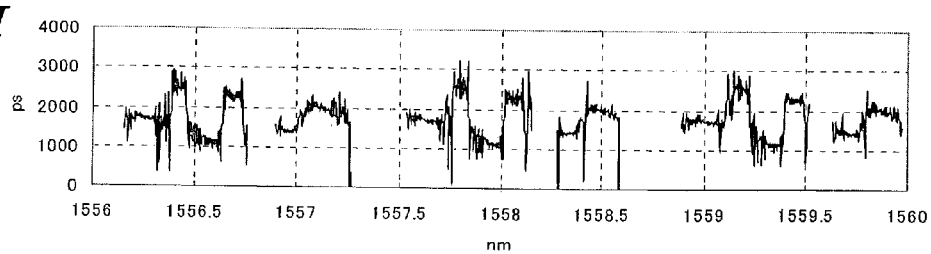
FIG. 11I is a diagram showing an experimental result of an encoding according to the present invention, and is a graph showing a delay pattern of an encoder for Code 3.

FIG. 11G is a matrix chart representing Code pattern 3. FIG. 11H is a graph showing measurement results of reflectance patterns. FIG. 11I is a graph showing measurement results of delay patterns. As shown in FIG. 11I, three delay patterns each corresponding to Code pattern 3 were observed at a constant interval. The three delay patterns respectively correspond to three wavelength channels.

As has been confirmed with the experimental results above, by varying the temperatures of the fiber gratings for realizing different code patterns, the plurality of delay patterns replicated on the wavelength axis are also changed simultaneously. In other words, the present invention makes possible a simultaneous optical encoding program for multiple wavelengths.

In the above experimentation, three code patterns of FFH-CDMA are used in conjunction with three wavelength channels of WDM, thereby realizing encoding/decoding on a total of nine channels. By increasing the number of fiber gratings in the encoder or decoder for increasing the number N of chips of each code, it will be possible to further increase the total number of channels.

As described earlier, in order to increase the number N of chips, it will be effective to bring the shape of the reflection band provided by each fiber grating as close to a rectangular shape as possible. In order to realize a near-rectangular reflection band shape, "apodization" would be effective, as mentioned above. An apodization function A(z) can be expressed by the following equation, for example.

$$A(z) = \tanh\left[4 \cdot \left(\frac{z}{L}\right)\right] \cdot \tanh\left[4 \cdot \left(1 - \frac{z}{L}\right)\right] \quad [\text{eq. 2}]$$

By ensuring that each fiber grating has changes in refractive index which are obtained by multiplying by such an apodization function A(z) the changes in refractive index $\delta n(z)$ as shown in (a) of FIG. 4, for example, reflection bands in which ripple is suppressed can be created.

Next, an advantage of using sampled gratings (sinc function-type sampled gratings) which are refractive index-modulated with a sinc function as shown in (c) of FIG. 4 will be described.

By using such sinc function-type sampled gratings, it becomes possible to realize uniform replication of reflection bands for a greater number of WDM channels, thus enabling simultaneous encoding/decoding.

In a sinc function-type sampled grating, a reflectance distribution is uniformly replicated over a plurality of reflection bands, due to sampling. The changes in refractive index as shown in (c) of FIG. 4 are expressed in terms of a product obtained by multiplying a sinc function with the apodization function of eq. 2, according to the following equation.

$$\text{Index}(z) = \quad [\text{eq. 3}]$$

$$\frac{\sin\left[\pi \cdot G \cdot \left(\frac{z}{P} + \frac{P}{2 \cdot L}\right) \cdot \frac{L}{P}\right] \cdot \tanh\left[4 \cdot \left(\frac{z}{L}\right)\right] \cdot \tanh\left[4 \cdot \left(1 - \frac{z}{L}\right)\right]}{G \cdot \sin\left[\frac{\pi \cdot L \cdot \left(\frac{z}{P} + \frac{P}{2 \cdot L}\right)}{P}\right]}$$

Hereinafter, a simulation result of an apparatus according to the present invention which was produced by using sinc function-type sampled gratings will be described. In the simulations, fiber gratings which were produced under the conditions shown in Table 7 below were used.

TABLE 7

| | |
|---|---|
| number N of fiber grating | 10 |
| length L of each fiber grating | 10 mm |
| interval I between fiber gratings | 0 cm |
| P | 200 μm |
| G | 8 |
| Δλ | 0.3 nm |

Figure 12:
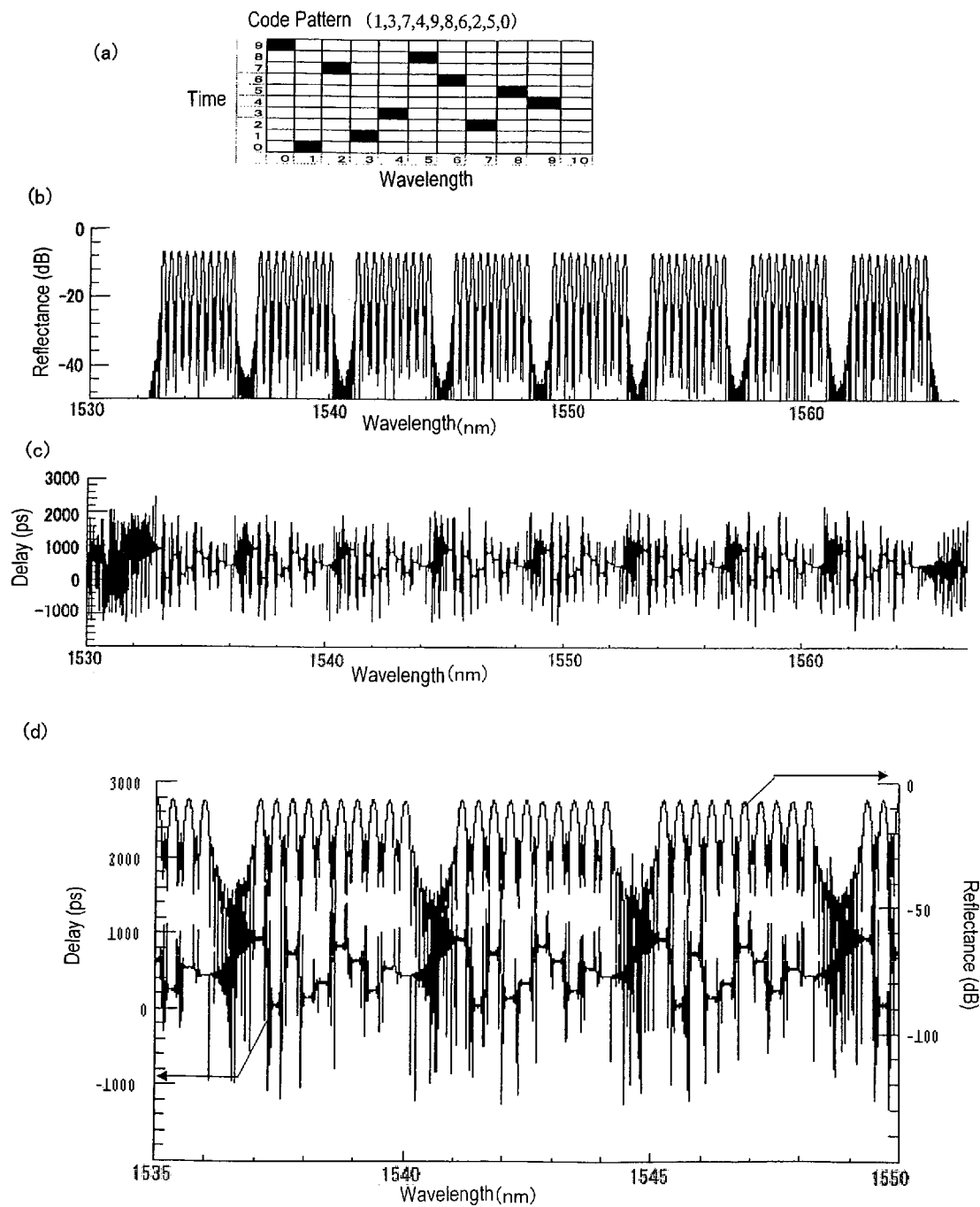
FIG. 12 is a diagram showing another simulation result of an encoding according to the present invention which utilizes a sinc function-type sampled grating, including: (a) a matrix chart showing a certain encoding pattern; (b) a graph showing a reflectance pattern of an encoder for the encoding pattern; (c) a graph showing a delay pattern of the encoder; and (d) a consolidated graph showing enlarged versions of the graphs of (b) and (c).

FIG. 12 includes: (a) a matrix chart showing a code pattern; (b) a graph showing a reflectance pattern of a decoder as obtained from the simulation; (c) a graph showing a delay pattern as obtained from the simulation; and (d) a graph showing enlarged portions of the graphs of (b) and (c) of FIG. 12 overlaid upon one another.

As shown in FIG. 12, a code pattern whose number N of chips is ten (i.e., having ten chips) is replicated eight times over substantially the entire C band. The replication period ΔT is 3.2 nm. These eight reflection bands are available as eight channels of WDM. As can be seen from (d) of FIG. 12, the delay pattern corresponding to the code pattern is also appropriately replicated.

From the above simulation, it was confirmed that the use of sampled gratings makes it possible for a single apparatus to perform optical signal encoding/decoding (in which ten chips are used) simultaneously on eight channels of wavelength division multiplexing.

As described earlier, instead of using gratings of different structures having individual central reflection bands which are initially shifted by Δλ×integer, gratings having the same structure may be used, with their temperatures or tensions being adjusted so that the central wavelengths of their reflection bands are shifted. For example, ten sampled fiber gratings may be used, with their temperatures being respectively set to e.g. 168° C., 96° C., 216° C., 192° C., 144° C., 48° C., 120° C., 0° C., 24° C., and 72° C. In order to prescribe a temperature over 80° C., another type of heaters may be used instead of Peltier devices. By changing the distribution of temperatures to be applied to the ten sampled fiber gratings, a different code pattern can be programmed.

In each of the above embodiments, the reflection bands are shifted by adjusting the temperatures of the fiber gratings. Alternatively, the reflection bands of the fiber gratings may be changed by using other types of devices. For example, piezoelectric devices may be used to change the tensions to be applied to the fiber gratings and shift their reflection wavelengths. What is important is the ability to independently change the grating period of each fiber grating for enabling arbitrary changes (programming) in the encoding pattern or decoding pattern.

Note that sampled grating structures are classified into those with modulated amplitudes and those with modulated phases. Both types of sampled grating structure are applicable to the present invention.

Figure 13:
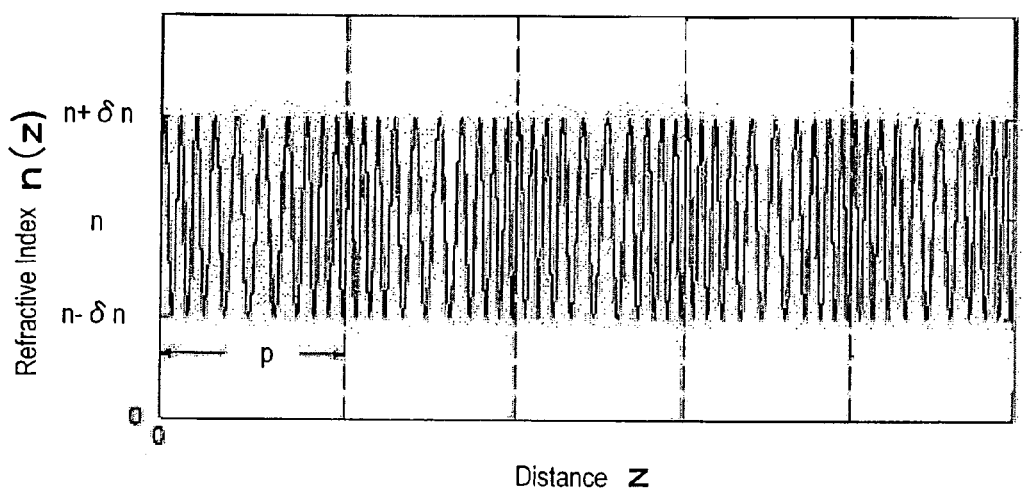
FIG. 13 is a graph representing a sampled grating structure (phase modulate type) which is disclosed in IEEE Photonics Technology Letters, Vol. 15, No. 8, August 2003, Hojoon Lee, Govind P. Agrawal.

In each of the above present embodiments, sampled grating structures with modulated phases are adopted. When producing sampled grating structures with modulated phases, their refractive indexes may be modulated as shown in FIG. 13, for example. FIG. 13 is a graph showing a sampled grating structure which is disclosed in IEEE Photonics Technology Letters, Vol. 15, No. 8, August 2003, Hojoon Lee, Govind P. Agrawal. The vertical axis of the graph of FIG. 13 represents the refractive index n of the grating, and the horizontal axis represents a position along a direction parallel to the longitudinal direction of the grating. In the graph, "P" represents the sampling period. The refractive index n is modulated between a maximum value n+δn and a minimum value n−δn. Thus, sampled grating structures having periodically changing phases, instead of periodically changing amplitudes of refractive index modulation, may be used to realize the present invention.

The apparatus of the present invention can realize an OCDMA encoding and/or decoding of wavelength-division-multiplexed light by using a simple structure. Therefore, it is possible to support an increased number of channels with a simple apparatus structure.

The apparatus of the present invention is suitably used for not only mobile devices such as mobile phone terminals, but also in combination with any other known constituent elements for composing a communications system.

The present invention is applicable to an encoding/decoding system which comprises an apparatus functioning as an encoder and an apparatus functioning as a decoder.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An apparatus for performing, by optical code division multiplex access (OCDMA), at least one of encoding and decoding of wavelength-division-multiplexed (WDM) light, comprising:
    an optical input/output section for handling input/output of the wavelength-division-multiplexed light; and
    N fiber gratings (where N is an integer equal to or greater than two) which are in a series connection to the optical input/output section, wherein,
    each of the N fiber gratings has a sampled grating structure defining a plurality of reflection wavelength bands; and
    an interval ΔT between central values of the reflection wavelength bands of the sampled grating structure is equal to an interval S between central wavelengths of wavelength bands contained in the wavelength-division-multiplexed light, and the central values of the respective reflection wavelength bands differ from one fiber grating to another at least during operation.

2. The apparatus of claim 1, wherein, between fiber gratings, the central value of each respective reflection wavelength band has a difference which is greater than a bandwidth of each reflection wavelength band and smaller than ΔT/N.

3. The apparatus of claim 1, comprising, for each fiber grating, a code program device for controlling the sampled grating structure,
    wherein the code program device is capable of shifting the central values of the reflection wavelength bands defined by each sampled grating structure.

4. The apparatus of claim 3, wherein the code program device is capable of causing a period of refractive index modulation of the sampled grating structure of each fiber grating to be changed via heat or stress.

5. The apparatus of claim 4, wherein an amount of change in the period of refractive index modulation of each sampled grating structure introduced by the code program device is prescribed to be a value which is greater than the bandwidth of each reflection wavelength band.

6. The apparatus of claim 1, wherein the refractive index modulation of each sampled grating structure is modulated according to a sinc function.

7. The apparatus of claim 5, wherein each sampled grating structure has a first region which provides a refractive index modulation with a relatively large amplitude and a second region which provides a refractive index modulation with a relatively small amplitude, the period of modulation of the first region being equal to the period of modulation of the second region.

8. The apparatus of claim 1 operating as an encoder.

9. The apparatus of claim 1 operating as a decoder.

10. The apparatus of claim 9, the apparatus decoding a signal which is encoded by the apparatus of claim 1.

11. An encoding/decoding system comprising the apparatus of claim 1 and the apparatus of claim 10.

* * * * *